INVENTOR
WALTER O. BEYER
his Attorneys.

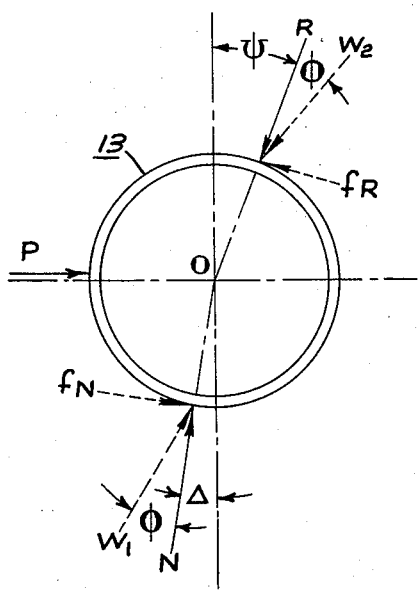
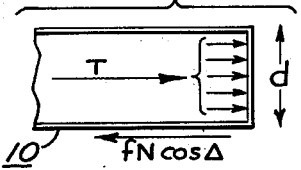
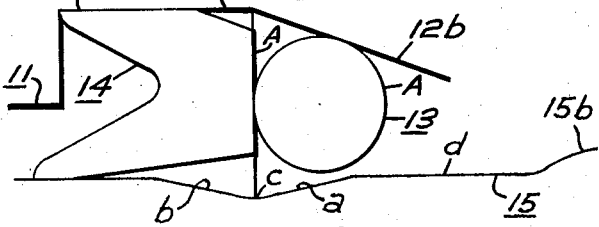
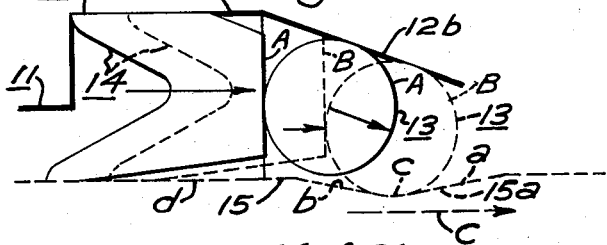
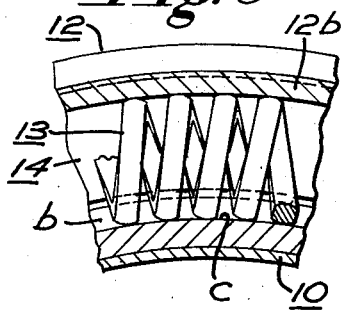
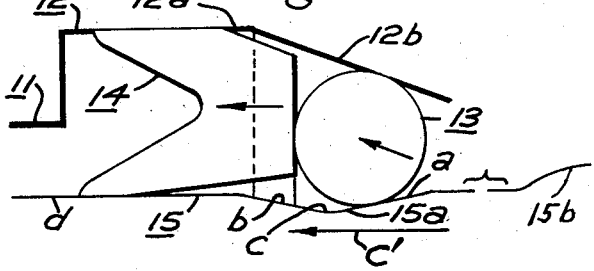
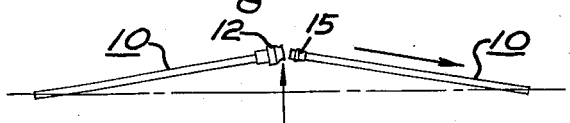

United States Patent Office 2,846,240
Patented Aug. 5, 1958

2,846,240

COIL SPRING DETENT COUPLING WITH DIFFERENTIALLY TAPERED OPERATING SURFACES

Walter O. Beyer, Pittsburgh, Pa.

Application July 23, 1957, Serial No. 674,006

3 Claims. (Cl. 285—5)

This invention relates to a push-in assembling and pullout releasing type of fluid coupling for connecting one fluid-carrying member to another, and particularly, to a coupling device or unit for removably holding an end portion of a fluid conduit or pipe member in position within a housing body member, or in position with respect to an end of an adjacent pipe member to provide a detachable connection with or between one or more fluid-carrying members. My invention deals particularly with an improved quick-release type of coupling which will provide a fluid seal with respect to the members being connected, will securely hold the members in position when fluid pressure is applied, and will permit the pipe member or members to be quickly and easily disconnected when and only when fluid pressure is released.

This is a continuation-in-part of my application of the same title, filed July 2, 1956, Serial No. 596,381 (now abandoned), which is a continuation of my application of the same title, filed November 13, 1952, Serial No. 320,298 (now abandoned), which, itself, is a continuation-in-part of my application of the same title, filed June 14, 1949, Serial No. 98,945 (now abandoned).

A quick detachable type of coupling is particularly suitable to facilitate the use of a portable pipe line system in irrigation; its successful utilization is closely tied-in with the nature of and the manner in which it is to be employed. Fluid leakage must be at least minimized to avoid puddling along the crop bed and this is particularly important where a seeded bed is being sprayed. Further, it is advantageous to be able to separate a pair of conduit or pipe members at any intermediate position along a connected pipe line system, without the necessity of starting from one end of the system and removing each pipe section in a progressive or step-by-step manner, and without the necessity of turning the members with respect to each other.

Briefly summarized, the following factors must also be considered in the provision of a fluid coupling used, for example, for irrigating purposes: In the first place, the coupling should be positive and fool-proof from the standpoint of its member holding action. In the second place, utilizations require a coupling that is, in effect, flexible, or in other words, that permits a certain amount of pivotal movement between the connected members while still maintaining its holding and sealing action. In the third place, the coupling should be of a minimum weight from the standpoint of ease of transportation and should make possible the utilization of relatively light weight conduit or pipe members; in this connection, the minimum overall length of its housing member and the construction of its parts enter into the problem. In the fourth place, the coupling should have the ability to retain a pipe or conduit section in a position-limited, connected or held relationship, regardless of the number of times fluid pressure is turned on and off; that is, it should prevent a connected end of a pipe or conduit section from moving axially-longitudinally out of its housing body under such conditions. In the fifth place, the coupling should lend itself to inexpensive high production methods of manufacture. And, in the sixth place, the coupling should work effectively even when sludge, dirt, and other foreign materials are present.

Previous to my present invention, there have been two general types of so-called quick-release coupling constructions. One type is exemplified by my Patents Nos. 2,184,376, 2,587,810, and 2,259,453. These disclose a coupling that has what may be termed a proportional, fluid-pressure-sensitive gripping action on a cylindrical conduit or pipe member to be held. This type of coupling has the disadvantage of tending to creep and to do so progressively with "on" and "off" fluid pressure applications. This introduces a problem where a considerable number of pipe or conduit members are connected in progression, as for use in an irrigating layout. Although creep between the end of each pipe member and its coupling may amount to only ½ of an inch (each time that fluid pressure is applied and released), this small movement taken accumulatively from the standpoint of, for example, fifty couplings, becomes very appreciable.

In some cases, it is desirable to retain exact positions in a coupled line, for example, in sprinkler lines that are taken off at substantially right angles to feeder lines. Prior to my present invention, it has been customary to meet the latter need by a coupling, such as illustrated by the Wallace Patent No. 2,709,092. This patent exemplifies the other general type. In this particular construction, the grip coil has what may be called a mechanical-interlock within a groove of a curvature corresponding to the coil and that is provided in a nose end portion of the conduit member. The disadvantage of this type of construction is that in its interlocked position, it cannot provide the automatic, resilient, shock-absorbing action of the first-mentioned type. To avoid rupture under shock loads in a line using a mechanical interlock type of coupling, pressure release valve devices are needed and especially, when the line is being filled up with liquid after air pressure has built up in an end of the line.

In view of the above considerations, it has been an object of my invention to meet the factors involved and provide a solution to the problem presented in the employment of the type of fluid couplings here involved.

Another object has been to provide an improved coupling of a flexible type that can be readily adapted to manufacturing procedure or fabrication methods, that will be simple and efficient in utilization, and that will be relatively inexpensive in cost;

Another object has been to device a shock-absorbing and recoil-return type of coupling;

A further object of my invention has been to devise coupling devices to meet the various requirements of those skilled in the art, and particularly, to meet field requirements for lightness, simplicity, and for an easy withdrawal of the pipe members when fluid pressure is off;

A still further and important object has been to devise a compound slope type of coupling unit or construction;

These and many other objects will appear to those skilled in the art from the illustrated embodiments hereinafter set forth.

In the drawings, Figure 1 is a vertical side view in elevation and partial section, showing a preferred form of coupling unit or device constructed in accordance with my present invention; this figure shows an initial inserted relationship of the opreating parts of the device before fluid pressure has been applied;

Figures 3 and 4 are vector diagrams which are employed in illustrating mathematical phases of the invention involved;

Figure 1:
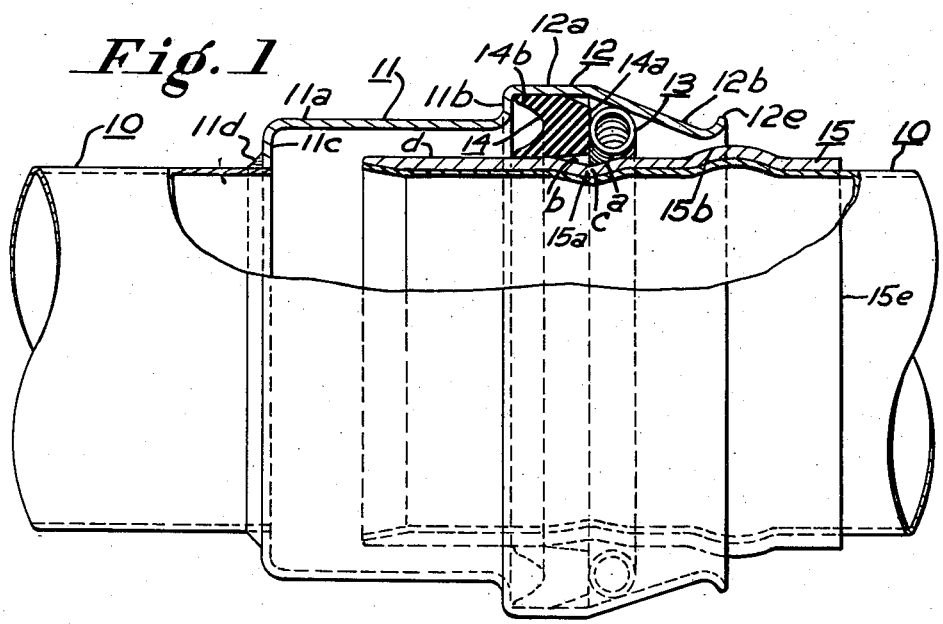
Figure 1A is a fragmental vertical section in elevation of the construction of Figure 1, but showing another preliminary relationship of the operating parts of the device after an initial or relatively low fluid pressure has been applied; this view shows a normal operating and creep-return position of my coupling.
Figure 1A:
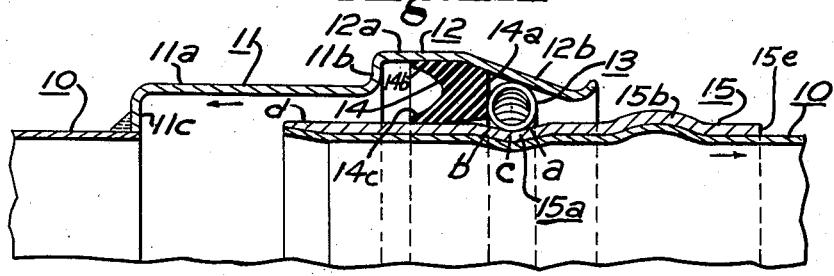
Figure 2:
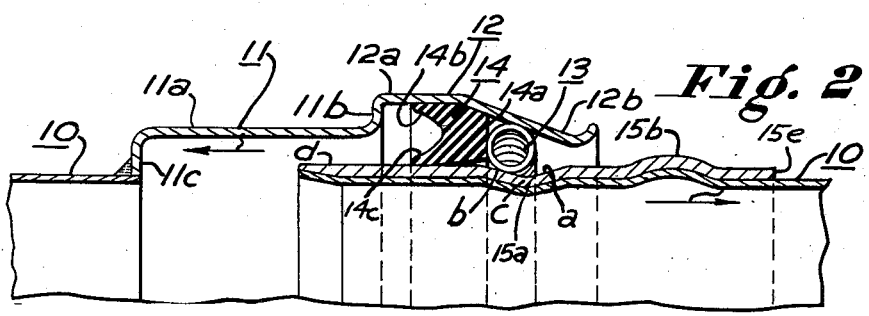
Figure 2 is a view similar to Figure 1A, but discloses a relationship of the operating parts and the relative movement effected, after a full, relatively high fluid pressure has been applied, and when the initial position is the position indicated in Figures 1 or 1A.

Figures 5, 6 and 7 are somewhat diagrammatic views illustrating the operation of a device, such as shown in Figures 1, 1A, and 2; Figure 5 shows the same relative relationship of the operating parts as disclosed in Figure 1; Figure 6 shows how the pressure gasket and the grip element are advanced along the inside of an operating portion of the coupling housing body when pressure is applied and how a nose part carried by the pipe member may move slightly outwardly (see arrow C) to cause the back or inner shoulder face or operating surface side b of its groove or offset positioning portion 15a to retain a grip element 13 in latching engagement with and on such face; and, Figure 8 shows the releasing movement on a pressure gasket 14 and the grip element 13 after fluid pressure has been relieved and when the coupling nose part is moved inwardly, as indicated by the arrow C';

Figure 8 is an enlarged cross sectional detail taken on Figure 2 and illustrating construction of the grip element;

Figure 9 is a somewhat diagrammatic plan view illustrating a separating feature of my construction.

This invention provides a coupling which has a resilient shock-absorbing action between its members such that line surges are no longer a problem. Today centrifugal pumps are preferred in many installations, but tend to cause a pulsating action to fluid flow. Such pumps in their operation, set up pressure surges of the fluid which progressively build-up in momentum towards the end of a rigid pipe line. Heretofore, to protect against such shock waves reaching dangerous maximum, it has been customary to use pressure relief valves in the line. This not only increases the expense of an installation, but in an outdoor portable system increases its complexity and provides weak areas that are subject to clogging and damage during the handling of the system and during its operation.

My early construction provided a coupling having a pair of opposed operating surfaces to operatively carry a cooperating fluid-pressure-sensitive gasket and a flexible grip coil or annulus. One of the opposed operating surfaces constituted a cone-shaped throat while the other constituted a substantially cylindrical or annular surface between which the grip annulus had an effective member holding action that was in proportion to the amount of fluid pressure being applied. In accordance with this concept, it was necessary to provide a converging cone-shaped throat which had an angle of slope of not greater than a certain determined amount, as otherwise the member holding action would not apply.

The holding position of the gripping member was not operatively fixed by mechanical construction or form. However, surging pressures were compensated for or dampened-out by a rolling action of the coil turns, individually and collectively, in a reciprocating manner. This could be noted by a slight movement "in" and "out" of the connected tube at the open end of the coupling. It is especially notable in a closing member of a line under surging pressures. However, the gripping position with the plain end tube varies according to the final holding position that the gripping member automatically assumes.

In the above type of coupling, intermittent surges, such as above mentioned, thus tend to cause the coupled members to progressively move outwardly or creep. To obviate such difficulty, some have utilized a so-called mechanical type of holding action which is positive, in the sense that the grip annulus is always held in a rigid relationship upon the application of fluid pressure with, for example, a groove portion of a coupling nose. This type of connection, however, does not provide the proportional member-holding action of the first type and thus, loses the flexibility and take-up action that is desirable in such a system.

My present structure is based on my endeavor to solve the problems presented by the two above types of coupling systems. The result has been a coupling that combines the advantages of both systems without their heretofore inherent disadvantages. That is, my present form of coupling provides an effective type of flexible force-absorbing or take-up action; in other words, joint resiliency and a fully pressure-sensitive member-gripping action is attained. This provides the advantages of my early type, but at the same time has the one advantage of the mechanical interlock type, from the standpoint that the members are positively held in an area of operation, so that they cannot inadvertently creep or separate apart, but must always operate and will operate within a designated operating area.

It is recognized that the total length of the line should be held within narrow limits, in order that sprinkler spacing will remain constant, especially for row crop irrigation. I, in effect, neck the pipe, tube or nose end at a desired holding point to provide a pair of inward, conically-opposed surfaces forming a groove at such point.

In developing my present form of coupling, I discovered that a relatively wide form of groove portion could for the first time, be used in connection with a fluid-pressure-sensitive member-proportionate-gripping-action, provided that the groove, when the grip annulus is resting within its lowest portion, must be such that the arc or curve of the coil will define tangents and particularly, at its compressed coil turns or convolutions, with front and back operating surfaces that slope radially-outwardly from the base of the groove. This is distinguished from a so-called circular arc type of groove which does not permit the coil to have any longitudinal or axial movement under load with respect to the coupling joint. As a result, the coil turns act as solid wedges.

As distinguished from this, in my groove portion, the base continues into conical surfaces that have a tangential slope of a pre-determined amount, so that there will be what amounts to a differential gripping action with respect to an opposed throat of the housing body. Although it was heretofore thought to be necessary to provide only one sloped surface and that within a maximum angular relationship, I have made the discovery that two sloped surfaces could be employed, provided that the difference in the angular relationship therebetween them is less than a certain maximum, from the practical standpoint not more than about 17°. Thus, by providing a tangential contact with the grip coil by means of front and back conical faces, extending or inclining upwardly from the base of the groove in the direction of opposite force applications, a track for each coil turn is assured.

When fluid pressure is applied to a coupling of my present construction, the grip coil or annulus is slightly compressed and will tend to roll at its under-periphery backwardly along the back face of the groove portion and at its outer periphery forwardly along the declining slope of the operating surface of the housing body. This, in effect, not only assures a full holding action that is proportional to the fluid pressure being applied, but also a rolling action that may be compared to a recoil action against a pressure surge or hydraulic shock, as for example, in the recoil action of an artillery piece. This so-called "recoil" action is new in a coupling that has a proportionate or fluid-pressure-proportioned member-holding action, it eliminates the tendency of a pipe member to move or creep out of a coupling housing body, and, at the same time, eliminates the rigidity and lack of snock resistance of a purely mechanical gripping action.

Thus, the heretofore necessary pressure relief valves need no longer be used. At each coupling there is a certain amount of movement of the grip coil backwardly and forwardly within the groove, but never "out" of the groove while fluid pressure is being applied. Thus, there is a positive position-holding action that is a safety feature as to end blow-out, etc., that positively prevents line creep and a longitudinal extension of the line (individually or combined as to line sections). The latter might result in an elongation of from one to several feet in a relatively long pipe line. That is, a fraction of an inch or so of creep at each coupling will tend to build up to a considerable length for a plurality of couplings of a connected line. This entails difficulty at connected ends of the line and, of course, from the standpoint of space requirements of the layout.

Thus, in my new type of construction, there is a resilient shock-absorbing or recoil and a positioning-retaining action that automatically maintains a limited operating area for the grip coil and within which rolling movement of the coil may result so as to preclude one-position rigidity. In other words, there is a shock-absorbing resiliency obtained as to the joint while at the same time a positive position area holding retention. A centrifugal pump is of a relatively high capacity variable discharge type which at low head has a capacity that is considerably greater than its operating capacity and as a result, tends to very rapidly build up momentum in the water column, thus creating a shock hazard and disrupting the system. I have seen an end of a pipe line kicked into the air like a projectile with a failure in an old link type of coupling under such conditions.

In accordance with my invention, at all times there must be a tangential, as contrasted to a circular arc, contact between the grip coil or annulus and a front face of the groove portion; there must be a rolling action with the tangential contact; there must be a proportionate member-holding action, as effectively accomplished by the differential angular relation between radially-opposed operating surfaces and the use of conically, rather than arcuately shaped front and back faces of the groove portion. Thus, in accordance with my invention, a small, for example ⅛ of an inch, rolling action may be accomplished without any danger or damage, while at the same time providing both a proportionate member-gripping action and a positive retention of the relative positioning, axially-longitudinally between the tube end throat and the coupling nose.

By way of example, when a centrifugal pump is started-up, it will first cause the water to fill up the space, both water and air are now in the closed system of the pipe length. As the pump continues to operate, the water column continues to push-in and in this way builds up the air pressure to a dangerous amount. Although the whole line thus becomes under tension, the repeated surge shocks are most severe at the end of the line due to inertia. Thus, this is where most blow-outs occur. Eventually in connected sprinkler lines, air escapes through sprinkler nozzles; nevertheless, this venting is not sufficient to prevent rapid build-up of air pressure under the rapidly moving column into the system. Pressure surging action can also occur when there is no air in the system by opening outlet valves into the sprinkler lines.

Shock pressure moves to the end of the pipe line with a speed of sound and surges back and forth with such a speed. In accordance with my present coupling construction, there is produced a reciprocating rolling action of the grip coil during such forward and return movement which is not possible in a mechanical type of coupling and which is not provided in a proportion member type of gripping action where the nose or one of the opposed operating surfaces on which the grip coil operates is of cylindrical or rounded form, as distinguished from an offset or tangential-contact defining grooved form.

When the pressure is off, the grip coil in my construction will seek its central position or base-face-contacting with respect to the groove portion or, in other words, will return to a position where its rests over the base of such groove portion and in such central position is retained for restricted rolling movement in either direction forwardly or backwardly on the front and back faces of the groove portion. Since tangential contacts are initially maintained between the grip coil and the front and back walls or faces, the coil provides, in effect, a pair of position contacts on opposite sides of a diametric plane through centers of the grip coil turns. It must not be fixed by any relative positions of the coupling with the end tube.

When fluid pressure is applied, there are two opposite movements that are produced, namely, an outward thrust upon the coupling nose and a backward thrust on the housing body which consists of a positive seating of the grip coil in the operating surface, but in such a manner, that it is free to roll on either slope of the groove portion in the tube, pipe or nose end. There must be cone surface segments on both the front and back faces of the groove or radially-inwardly offset annular portion. The resilient rolling action of a shock-absorbing nature follows with the return of the coil on the conical surface or face of the groove. There must be a relative or differential angle defined between the throat and the forward face of the nose that will assure an effective and proportional fluid-pressure-actuated gripping action of the grip annulus or its convolutions on the conduit nose; this angle to be effective, must be within a maximum of 17 degrees. The back face or surface of the groove or annulus has a dual function, namely, as a release shoulder for the grip coil after fluid pressure has been turned off, and also as one side of a tapered, opposite-sided movement-restricting or longitudinal-axial, operating surface-restricting area for the grip annulus and thus, of the nose part with respect to the housing body part.

In the operation of my coupling, the pressure differential on the heel of the gasket ring is transformed to the coil turns on the slope of the coupling throat which, in turn, reacts on conical surfaces or faces of the tube or nose groove portion. This results in a traction action the same as a driver on the rail of a railroad engine. One of the results obtained is that all recoil shock is, from a practical standpoint, substantially fully dampened-out by the resilient mounting and operation of each coupling assembly. It is progressive of couplings along a line to provide an accumulative shock-absorbing action for the entire line.

My present invention deals with a structure which automatically, elastically or resiliently returns a coupling body and a coupled conduits end or nose portion to an exact aligned relationship with each other. At the same time, it provides a proportional, fluid-pressure, sensitive type of gripping action that is shock-absorbing or that provides a rolling, elastic-like, take-up movement from within an operating groove of the coupling, effectively prevents a shooting-out of the conduit end portion on the one hand and, on the other hand, effectively insures against bursting of the coupling.

The combination of water pressure and entrapped air pressure presents the worst possible condition with respect to shock action, such as may be caused by starting a centrifugal pump and applying pressure suddenly to the line. At low pressures, a centrifugal pump will discharge a greatly augmented volume over and above volumetric discharge at operating pressures. Conditions that lead to hydraulic shock are damaging and destructive, particularly in an irrigation line system where frequent starting and stopping of fluid pressure applications is an inherent feature in utilizing the system. It is inherent that mechanical interlocks are subject to failure due to hydraulic shock and water hammer.

As distinguished from the mechanical-interlock type of coupling, I employ a resilient, annular grip coil or annulus to accept surges, etc. and to dampen them out by moving or rolling slightly (about 3/16 to 1/16 of an inch) in a longitudinal direction along the nose end of a conduit member at the time of pressure application, but within a position-retaining groove portion whose opposed sides present a spread-apart section to and are spaced from the grip coil when it is centered therein. Such opposed sides make a tangential-rolling contact with the grip coil and have cone-shaped surfaces that diverge away from the grip coil. It is essential that one of the sides (the inner end side $b$) have an operating surface of planar section and that it converge outwardly or forwardly in the same direction as a cone-shaped throat operating surface portion (also of planar section) of the housing body. Although having an inner diameter larger than the outer diameter of a cylindrical portion $d$ of the conduit nose, the grip coil is yieldably-contractible to stay within the operating or grip coil-positioning groove portion and elastically-roll return towards its original position therein under a stable perssure and upon a release of fluid pressure. In other words, it provides an automatic rolling-grip take-up for surges and excessive pressure, etc., but returns towards its initial or starting position within the groove portion under a stable or low pressure. There is no fixed-position shock effect, as in a mechanical interlock arrangement, wherein the groove cross-section corresponds to the curvature of the coil turns and is latch-engaged between opposed, complementary sides of the groove, thus necessitating pressure-relief valves or devices to avoid rupture under shock loads.

My present type of coupling is highly effective, in that it provides the automatic take-up and releasing action of the above-mentioned first type and, at the same time, provides a rolling take-up, a rolling (resilient) creep return and a starting and stopping place or position from which the coupling will always operate. This is accomplished by the utilization of a radially-outwardly-spread-open groove portion 15$a$ in the nose end of the pipe or conduit member which groove portion is defined by opposed and, as shown, by cone-shaped sides whose slope is greater than and define a tangent with the curvatures of the grip coil. Thus, the grip coil is free to provide a differential operating or take-up rolling action as well as an elastic return between an inwardly or backwardly-positioned, cone-shaped operating surface of the groove portion and an opposed cone-shaped throat portion of the coupling body.

In the second place, I have discovered that the critical relationship as to a so-called automatic type of quick-release coupling can be provided, even if the angular relationship or the slope of the opposed operating cone-shaped surface of the coupling body member exceeds the critical value. The condition is: (1) that the above-type of open groove portion be provided in the cylindrical nose end of the conduit and with a back or inner opposed cone-shaped surface that converges in the same direction as the cone-shaped throat of the coupling body, and (2) that the difference between the values of the two slope angles be less than that of a critical slope angle (which has been rather fully evaluated in Beyer et al. Patent No. 2,259,453). It will be noted that as to a compound type of taper, such as here involved, the differential angle of taper should constitute an effective single surface taper for a fluid-pressure-proportioned gripping action on the conduit nose.

By employing an inward offset or groove having an open conical surface on the normally cylindrical tube end or nose of a conduit member, I also simplify design requirements for an effective push-in assembly and pull-out release fluid-pressure sensitive, quick-release type of coupling; provide an elastic safety feature; positively prevent a separation of the coupled members and, at the same time, eliminate a retention of lengthwise creep of the conduit member outwardly or forwardly from the coupling body member. Ordinarily in a non-mechanical latching type of coupling, periodic application and release of fluid-pressure causes a relative creep between the coupled members. In my present construction, the coupled parts, as aided by the resiliency of the grip annulus, return to their original or starting position after the release of fluid pressure and substantially so, when fluid pressure returns to a normal value, as distinguished from an above-normal or a surge value. This position-retained arrangement is only changed when fluid pressure is released and the conduit nose is moved inwardly to cause a push-out engagement of the front operating surface $a$ of the pair of opposed surfaces of the annular groove portion.

Compared to my original type of coupling, as exemplified by the above-mentioned Beyer patents, I obtain about three times the rolling action, because of a better control over the selection of slope where two opposed, cone-shaped rolling surfaces are provided. In the old type, in about 1,000 feet of line having fifty couples, it is possible to get an extension of the line of about two feet, for example, for each ½ inch creep at each coupling. However, in my new type, the maximum elastic expansion is only about ⅛ of an inch per coupling which gives a temporary about 8 inch total in the 1,000 foot line. In any event, progressive line extension is no longer possible, although an elastic shock-absorbing "give" in each coupling is inherent.

By my present invention, I have been able to meet all of the previously mentioned factors without setting up offsetting, disadvantageous operational features and in such a manner that all of the various factors have been met in a single and relatively simple coupling construction. In arriving at a solution to the problem presented, I also discovered, as exemplified by mathematical calculations hereinafter set forth, that what I have termed a compound type of operating surface relationship, could be effectively employed. In this connection, I have devised and employ opposed and spaced-apart operating surface portions (a housing throat and a conduit shoulder face portion) which slope or decline in the same forward direction (representing the direction of fluid pressure application) and between which a flexible grip annulus is advanced on an axis that is inclined with respect to the longitudinal axis of the conduit or of the fluid pressure separating action.

In accomplishing such a utilization, I determined that the grip coil or annulus may be effectively operated to latch-engage or grip an end portion of a conduit by providing the latter with a forwardly-declining operating axis, instead of one that is cylindrical or parallel to the longitudinal axis of the system. That is, contrary to what first appears to be impractical, I have determined that highly advantageous results are obtained by employing forwardly-declining opposed operating surface portions on both the housing body and the end portion of the conduit member to be held. This is dependent upon the following important considerations: (1) that the opposed operating surface portions be substantially cone-shaped or of planar longitudinal section and converge or decline in the same forward direction; (2) that the opposed operating surface portions have a differential declination in the direction of the application of fluid pressure, such that a forward-rolling gripping effect is produced on the grip annulus by the joint effort of a resilient annular gasket and the operating surface portion (shoulder face portion) of the conduit, and (3) that the difference between the declination or slope of the two operating surface portions be maintained below the maximum critical angle which would be involved if a single sloped operating surface was employed. The declination or slope of one of the operating surface portions must always be greater than that of the other operating surface portion, so that a differential angle is defined therebetween which then becomes the effective forward operating axis of the grip annulus. From a practical standpoint, the greater angle should be in the housing body.

The above discovery now, for the first time, makes possible the utilization of a sharp angle of slope in the housing body member which exceeds the normal maximum critical angle for an effective member-holding action by utilizing a differential slope which is the effective longitudinal axis or operating slope of the grip annulus. As a result, I have discovered that the necessary length of a housing body (where the greater slope of operating surface is in such body) can be effectively decreased for a given maximum fluid pressure utilization, as compared to the early construction. This is important from the standpoint of minimized space requirements, from the standpoint of weight requirements, and even more importantly, from the standpoint of simplicity and ease of removal of the coupled end portion of the conduit. As to the latter, the present construction makes possible a short, non-turning, pull-out removal of the conduit end portion, as well as its removal when it is an intermediate section of a pipe line system by a buckling-out or radial type of pulling-out movement, as distinguished from a straight axial-longitudinal pull-out movement. I employ two opposed, relatively tapered (planar in longitudinal cross-section), gripping or operating surfaces that decline forwardly and with respect to each other to provide a differential force action. I thus attain a highly effective rolling type of latching or gripping action between the housing body and the conduit end or nose portion.

I have discovered that the forward separating effort exerted by pressure fluid on the conduit member that normally tends to move it out of the housing body and that is now translated upon forwardly-declining (backward or inward-positioned), operating face portion $b$ of the conduit, may for example, be three times the forward effort exerted by the gasket upon the grip annulus. This produces a counter-clockwise rolling gripping action upon the grip annulus, such that an effective holding or gripping action is accomplished and is, in effect, centered about the declining shoulder face portion of the end portion of the conduit member.

In employing the construction of my present invention, I have been able to eliminate the need for an initial abutting relationship between the inner periphery of the grip annulus and the end portion of the conduit member, in that the conduit member is held in position against longitudinal-outward movement by the advanced gripping positioning of the grip annulus (after a fluid pressure application) on the opposed declining operating surface portions. This position-limiting relationship may, however, be easily changed to remove the conduit member by manually moving the conduit member longitudinally inwardly or backwardly a short distance with respect to the housing body to move the grip annulus backwardly along the throat of the housing body in the direction of its divergence.

I have determined that a clearance can be provided between the inner periphery of the grip annulus and the top of the forwardly-declining back face or side surface $b$ when the annulus is in its initial position (before any fluid pressure has been applied) of, for example, about $\frac{1}{16}$ of an inch, although for removal purposes, $\frac{1}{32}$ of an inch may be sufficient for sizes smaller than 4 inches. The $\frac{1}{16}$ of an inch clearance will not spoil the effectiveness of the sealing action of the resilient gasket or pressure ring. Employing a relatively small clearance, such as above-mentioned, I can still maintain an effective sealing action without producing leakage puddles in the crop rows at the coupling joints.

My new construction eliminates the necessity for a relative turning movement between the coupling body and the conduit member when the latter is to be moved after fluid pressure has been released. In furtherance of the employment of the latter procedure and as another important feature of my present structure, I have provided a second or forwardly-positioned sloped front operating surface portion $a$ (shoulder face) on the conduit end portion which serves as a push-face to engage the grip annulus and move it and its operatively association gasket backwardly to their original or initial positions. This provides a positive manual release of the mechanical holding action of the grip annulus upon the conduit end portion after fluid pressure has been relieved.

I am thus able to release the latching action of the grip annulus or element and to then pull the conduit member outwardly relative to the housing body to remove it. This pulling-out action can be effected, even when the coupling joint has been moved to one side of or radially of the longitudinal axis of the pipe section. That is, the conduit end portion may be removed, even when the conduit is an intermediate section of a long string or line of connected sections in a system (see Figure 9). To assure an off-axial separation of coupled members, I provide the forward end of the housing body, or in other words, its operating throat, with an outwardly-turned flange or guide lip which has a spaced relationship with the end portion of the pipe or conduit. This lip or flange thus serves as a pivotal axis about which the coupled end portion of the conduit member may be pulled-out of the coupling body.

The action of the coupling of my optimum construction is distinguished from what I have termed a mechanical latching action on the basis that the slope of the operating shoulder face on the conduit end portion is made wider or of lesser taper than the radius of curvature of the grip annulus. That is, the forwardly declination of the side face $b$ of the conduit end portion will have an outwardly open angular relation of a tangential contact with the cross curvature of the turns of the grip annulus at the latter's line or point of engagement with the shoulder face. Stated in another way, groove or operating portion 15$a$ of the conduit end portion will be open from its base position on which the grip annulus is positioned when fluid pressure is initially applied and will not curve or slope on a line parallel to and about the grip annulus.

In accordance with my construction, utilizing a compound type of opposed, sloped operating surface arrangement, the gripping action is always proportional to the amount of fluid pressure being applied and there is no danger of a sudden release of the grip annulus. Further, the grip annulus is much more easily released when the conduit member is to be removed. It will thus be apparent that there is a further important consideration in my optimum construction, namely, in addition to considerations (1), (2) and (3), that (4), the slope of the backwardly positioned or forwardly declining shoulder face $b$ of the conduit end portion should define a tangent with the radius of the grip annulus or its coil turns. This establishes a rolling frictional contact.

Carrying these determinations further, I have found that very light wall or thin wall tubing or pipe member can be employed for ordinary pressures of 100 to 300 pounds or more, such as encountered in irrigation projects, etc., and thus, that it is only necessary to reinforce, thicken or provide a strengthened construction for the immediate operating parts or operating surface portions of the coupling.

Referring particularly to Figure 1, I have disclosed a coupling housing body composed of a connector portion 11 and an operating portion 12 that has an enclosing operating surface about its inner periphery within which an operatively associated resilient annular gasket 14 and a flexible latching or grip annulus 13 are carried. The connector portion 11 has a cylindrical wall 11$a$ terminating at its back end in an inwardly-projecting shoulder or flange 11$c$ that is shown secured by weld metal 11$d$ on an end portion of a thin wall pipe or conduit member 10. As will be noted, the shoulder 11$c$ extends at substantially right angles to the cylindrical wall 11$a$. The front end of the wall 11$a$ terminates in an outwardly projecting shoulder or flange 11$b$ that extends at substantially right angles to the wall 11a and to an enlarged integral, cylindrical wall 12a of the operating surface portion 12.

The rear cylindrical wall 12a terminates in an annular forwardly-declining or converging conic or annular operating-surface wall or throat 12b. The throat or wall 12b declines forwardly or converges axially-outwardly of the coupling body and has an outwardly curved or turned-out, projecting, bell-shaped front end flange or guide lip 12e. The flexible (resilient or elastic) grip annulus or helical, spring-like element 13 (see Figure 8) is normally positioned (see Figure 1) to abut or make an annular or circular line contact at its outer periphery with the throat 12b and to be operatively engaged by a heel portion 14a of the resilient annular pressure-sensitive and fluid sealing-off gasket 14. It will be noted that the gasket 14 has a pair of feather edges, 14b and 14c. The edge 14b is held in position by the abutment shoulder 11b and rests against the cylindrical wall 12a, while the other feather edge 14c is adapted to normally rest upon and abut against an opposed operating surface or nose part 15 of the removable end portion of a pipe or conduit number 10.

The nose part 15, of reinforcing construction which provides an operating surface for the conduit end portion, is provided with a radially-offset grip-element-positioning portion, groove or valley 15a that extends circumferentially thereabout and is in an axially or longitudinally-backwardly spaced relationship with respect to a positive release and limit shoulder 15b and with respect to opposite ends 15d and 15e of the nose part. As shown in the drawings, the positioning portion 15a has a pair of annular or cone-shaped side face portions a and b that project or slope radially-outwardly of the nose part 15 and whose vertexes end in a seating portion c. It will be noted that the front end 15e lies parallel to the end portion of the conduit member 10. The part 15 has a rather wide spaced-apart relationship with the bell-mouth lip 12e such that a pivotal flexibility is provided. As shown in Figure 9, the part 15 may be pivoted about the guide surface of the lip 12e in removing the conduit 10 from the housing body. The nose part 15 is securely mounted on the end portion of the conduit member by the portions 15a and 15b.

The nose part 15 which carries one set of operating surfaces for the coupling may have an inner diameter substantially corresponding to the outer diameter of the pipe end portion, so that it can be frictionally slid thereover. The offset or positioning portion 15a may be formed by an external rolling-in operation to both secure the nose part 15 on the end portion of the conduit 10 and provide substantially planar, tapered or sloped faces or side face portions a and b. The release shoulder 15b may be formed in a similar manner. This can also be effected by hydraulically operated dies.

As shown in Figures 1, 1A and 2, the positioning portion 15a is defined by an axially or longitudinally-extending annular, forward face shoulder portion a whose cone-shaped face slopes or declines backwardly into the seating base face or surface portion c and by an axially or longitudinally extending annular, back face or operating surface portion b whose cone-shaped operating face slopes or declines forwardly into the seating base portion c. As shown, the opposed side faces or surface portions a and b slope into a top or apex portion d that corresponds in diameter to the outer diameter of the cylindrical portions of the operating surface or nose part 15.

The annular release and limit shoulder 15b has an outward bulge with respect to outer diameter of the cylindrical portions of the operating surface 15, to provide a backwardly-declining shoulder face portion that can be employed to positively engage the grip annulus 13 and move it backwardly to a released position, in the event that extraneous material causes it to stick to such an extent that the smaller diameter shoulder face portion a moves past it without effecting its release.

As shown in Figure 2, the shoulder face portion b constitutes the latching and abutting engagement face for the grip element 13 when positive fluid pressure is applied and both the side faces a and b aid in operatively positioning the grip element in the seating portion c when fluid pressure is initially applied. The shoulder face portion a serves to push the grip element 13 towards the divergence of the throat 12b when fluid pressure is released and thus, out of gripping engagement with the portions b and d, when the nose 15 is relatively pushed axially-inwardly of the coupling body. Thus, a preliminary relative pushing-in movement of the conduit 10 enables it and its nose part 15 to then be pulled out with relative ease from the throat 12b of the coupling body. The grip element 13 is positively retained in latching engagement between the throat 12b and the portion b of the operating surface 15 of the conduit when fluid pressure is being applied to the pipe line or conduit system.

When fluid pressure is applied, compare Figures 1, 1A and 2, 5 and 6, the nose part or operating surface 15 advances longitudinally-outwardly or axially-forwardly (see arrow C of Figure 6) and the grip element 13 moves longitudinally-outwardly or forwardly, in the direction of convergence of the throat 12b, from position A to position B and into latching engagement with the face portion b. That is, the fluid pressure when initially applied, moves the nose part 15 and the end portion of the conduit member 10 slightly outwardly from the position shown in Figure 1 to the position shown in Figures 1A and 2 and the sealing gasket or pressure heel-carrying-element 14 forces the grip element 13 against the compound converging slope surfaces provided by the nose part 15 and by the inner face of the throat or tapered wall 12b of the operating surface portion 12.

Figure 7 shows the movement relationship of the operating parts when fluid pressure has been released and the face portion a is being employed to release the grip annulus; the arrow C' shows the direction of relative movement of conduit member 10 with respect to the housing body member. Figure 6 shows how the grip element 13 and the gasket 14 move or advance (compare positions A and B) when fluid pressure is applied; in position B, the grip element 13 is initially exerting a holding or gripping action on the conduit 10 and its nose part 15 that is proportional to the separating force exerted by fluid pressure between the housing body and the pipe member 10. When fluid pressure is released, the gasket 14 no longer exerts positive forward pressure on the grip element 13, and when it is desired to remove the pipe member 10 from the coupling housing body, the conduit 10 and its nose part 15 tend to move or release inwardly and the grip element 13 can be sprung or moved backwardly above the face portion b and towards the inner or diverging end of the throat wall 12b.

As shown in Figure 1, the grip element 13 is preformed, so that it will resiliently or elastically engage or abut within the inner enclosing periphery of the operating surface portion or inner face of the throat wall 12b adjacent to and slightly off the cylindrical wall 12a and ahead of the joint between the walls 12a and 12b, but will have a slightly spaced-apart relation with respect to an adjacent cylindrical face portion d of nose part 15, see Figures 1 and 7. It is thus apparent that pipe member 10 and its mounted nose part 15 may be withdrawn without the necessity of tilting the turns of the coil 13, or, in other words, the strut members provided by its convolutions.

The coupled end of the pipe 10 has a slight tendency to move inwardly with respect to the housing body part when fluid pressure is released and this movement aids the above-described releasing operation. The inner periphery of the grip coil 13 may have a maximum spacing of about 1/16 of an inch on diameter (approximately .03 inch) with respect to the connecting or intermediate cylindrical face portion $d$ of the nose 15 when fluid pressure is released and it is in its initial, pushed-in position of Figure 6.

The type of operating surface arrangement shown in the previously-mentioned Beyer patents may be termed a single-taper surface type, as distinguished from the compound type herein involved. The compound tapered operating surface construction of my present disclosure eliminates the need for a close engagement between the inner or internal periphery of the grip coil and the outer periphery of a tubing end portion that is to be held in position within a housing body. This provides a solution to a number of factors that may arise in connection with the utilization of the single taper type and without the danger of making the holding action of the grip element ineffective or less effective.

In the first place, the tubing end portion can now be withdrawn (when fluid pressure is released) by a simple push and pull action and without the need for a screwing-out action. In the second place, I can employ a smaller diameter of grip annulus 13. In the third place, I can prevent any outward creep-release of the tubing section from the housing body under the influence of intermittently-applied fluid pressure. The coupling is effective and positive in its gripping action even when sludge and dirt have been introduced into it.

I provide two opposed operating surface portions $12b$ and $b$ whose slope or convergence is in the same longitudinally or axially forward direction in which separating force is exerted by the fluid pressure of the pipe line. I also provide a grip-element-release surface portion $a$ whose slope or convergence is an opposite direction to that of the surface portion $12b$. My coupling also permits relative angular or pivotal movement between the housing body and the tubing section without adversely effecting its holding action.

As previously pointed out, it has been determined that a critical slope angle must be considered if a desired type of effective holding action is to be provided when fluid pressure is applied. Employing a compound type, the critical angle applies particularly to the slope angle of the operating face $b$ of the nose or pipe member part and substantially to the difference between this angle and the slope angle of the operating surface throat of the coupling housing body part. If, for example, it is determined that the critical angle maximum for a particular coupling utilization is 17°, I can employ a 20° slope on the coupling body part and a 10° slope on the nose part to give an effective operating angle of 20° less 10° or 10°. Since stresses on the tapered throat of the coupling body part, due to pressure at the grip element contact, are substantially inversely proportional to the slope or taper angle, such stresses may thus be substantially reduced by increasing its slope angle beyond the determined critical value and properly proportioning the slope angle of the nose part.

The curvilinear connecting radius $c$ of the immediate base or apex between the forward and back face portions $a$ and $b$ of the nose part preferably at least corresponds to the curvature of the grip coil element 13. Also, as shown, such face portions are of somewhat planar longitudinal section or of extended outline (of greater slope or outward divergence than the grip element from the radius base $c$ of the seating or positioning groove or offset portion $15a$) in my compound slope type of coupling, as distinguished from a so-called mechanical interlock type of groove (one which has a full radius curvature corresponding to the radius of the grip element). Among its other advantages, my compound slope coupling provides a smooth and effective holding action for an initial low fluid pressure application up to and beyond very high fluid pressures.

The use of a nose part 15 contributes to the utilization of thin-wall tubing and to an effective and efficient distribution of the stresses incident to the operation of the grip element 13 under pressure conditions between the opposed tapered operating faces or surfaces of the coupling unit. The deforming of the wall of the nose part 15 can be employed, as illustrated, to provide means for securing the nose part on the end portion of the pipe member which is to be removably coupled, and to provide a suitable operating face or faces for the grip element 13. In the embodiments shown, I provide the coupling body part with the bulged-out shoulder $15b$ which also limits the maximum introduction of the nose part within the coupling body part while, at the same time, permitting the separating movement of Figure 9 of the drawings.

Referring to Figures 3 and 4, the following references apply:

$T=$ the total dead end pressure in pounds upon a closed end of a pipe member, such as 10, which is to be removably connected by the coupling. This pressure is based upon the sectional area of the tube end and is therefore a given quantity for a particular size of pipe or pipe and nose part construction and is determined by the maximum line pressure of the fluid to be carried.

$$T = fN \cos \Delta \qquad (1)$$

$d=$ the outer diameter of the tube end, or if a nose part is used, the outer diameter of the latter.
$D=$ the outer diameter of the pressure gasket element 14.
$R=$ the normal reactive force in pounds exerted by the line contact of the grip element 13 upon the coupling body tapered throat portion, due to the coupling holding action under the application of fluid pressure.
$N=$ the normal pressure in pounds due to the pipe expelling action of the pressure fluid and equals $$\frac{T}{f \cos \Delta} \qquad (1a)$$

$f=$ the coefficient of friction (experimentally determined) between the grip element and the tapered operating surface portion or portions when the coil is at rest.
$\Delta=$ the angle of slope of the face $b$ on the nose part or of the pipe member which is to be removably connected.
$\chi=$ the slope angle of the operating surface of the throat of the coupling housing body part.
$\phi = \arctan f$.
$W_1=$ the resultant inward pressure in pounds upon the nose part (or conduit member) exerted by the grip element.

$$W_1 = \frac{N}{\cos \phi} \qquad (2)$$

$$= \frac{T}{f \cos \Delta \cos \phi} \qquad (3)$$

$W_2=$ the resultant pressure in pounds outwardly on the tapered throat of the coupling housing body part.

$$W_2 = \frac{W_1 (\cos \phi + \Delta)}{\cos(\phi + \chi)} \qquad (4)$$

$P=$ the total differential pressure upon the resilient pressure heel gasket element 14 required for conditions or equilibrium for the free body force diagram of Figure 5 and is consequently the total hydraulic pressure necessary for the coupling holding action.

$$P = W_2 \sin(\phi + \chi) - W_1 \sin(\phi + \Delta) \qquad (5)$$

$p=$ the unit pressure in pounds per sq. in., representing the maximum line pressure for which the coupling is to be designed.

The forces P, R, N, $W_1$ and $W_2$ are substantially concurrent at 0 in Figure 4. This assumption is rational, since a state of equilibrium exists with the grip coil 13 at a constant pressure.

I have worked out mathematically an accurate method of determining the size or diameter of the gasket 14 for a predetermined maximum pressure of fluid to be carried by the coupling. In utilizing such formula, I first determine the maximum value of the critical throat angle, and then select a throat angle and a nose angle taper which will give by subtraction an angle below the critical predetermined angle. The frictional force $f$ is experimentally determined for use in the formula. The required O. D. of the pipe member is also predetermined and used in the calculations; of course, the O. D. of the nose part will be substantially the same as that of the pipe member to be connected and may be considered such for the purpose of the calculations, in that after the calculations are made, a slight increase of dimension or area is added as a safety factor. In calculating the area or size of the pressure gasket 14 for an interlock approaching a mechanical type, I arbitrarily select an I. D. of the coupling housing and by means of the calculations $$\left(\text{where } f \text{ max.} = \frac{d}{D}\right)$$

determine if this is correct, since such I. D. corresponds to the O. D. of the pressure gasket 14.

In solving for P, it will be seen that $T = fN \cos \Delta$ from Figures 5 and 6, that $$N = \frac{T}{f \cos \Delta} \quad (1)$$

and that $$W_1 = \frac{N}{\cos \phi} \quad (2)$$

or $$= \frac{T}{f \cos \Delta \cos \phi} \quad (3)$$

$W_1$ may now be calculated, since T, $f$, cos $\Delta$, and cos $\phi$ are known quantities.

In the second step, assuming that all of the forces are concurrent at 0, the vertical components of such forces are summarized as follows:

$$W_1 \cos(\phi + \Delta) - W_2 \cos(\chi + \phi) = 0$$

thus $$W_2 = \frac{W_1 (\cos \phi + \Delta)}{\cos (\phi + \chi)} \quad (4)$$

Since $W_2$ is now known as the coil pressure on the tapered throat of the coupling, the thickness of the housing metal for various sizes of the couplings may be based upon a predetermined adequate wall thickness for the maximum line pressure involved.

In the third step, I summarize the horizontal components as follows:

$$P + W_1 \sin(\phi + \Delta) - W_2 \sin(\phi + \chi) = 0$$

Thus, $$P = W_2 \sin(\phi + \chi) - W_1 \sin(\phi + \Delta) \quad (5)$$

Since P is the total annular differential pressure required to effectuate grip coil action, P divided by line pressure $p$ pounds per sq. in. gives the annular area required for the resilient pressure gasket, or in other words, is the annular sectional area of the element 14.

The annular area for the resilient gasket element 14 added to the cross sectional area as determined by D of the pipe member, or more accurately the O. D. of the nose part, gives a combined area of the pipe member section and the pressure differential area. Thus, the diameter corresponding to this circular combined area, represents the outer diameter of the pressure gasket element 14 and the inner diameter of the cylindrical wall 12a of the coupling housing body part.

I have determined that the size or area of the pressure gasket 14 may be substantially the same whether a single compound, or so-called semi-mechanical interlock groove type of coupling is used. In a compound type, the greater the difference value of the angles, the less is the pressure. Where the maximum effective grip angle is 10°, the relative values of $W_1$ and $W_2$ illustrate that the resultant force inwardly upon the pipe member and the resultant force outwardly upon the coupling body will be slightly increased in a compound type of coupling. I have also determined that the O. D. of the pressure gasket 14 is substantially independent of line pressure.

In Figures 3 and 4, the magnitudes of the forces involved may be determined by treating a single turn of the helical grip element or coil 13 as a free body stabilized by concurrent forces in a plane. For practical purposes, the stresses in the coupling housing body due to coil turn pressures, are substantially inversely proportional to the throat angle for the same annular area of pressure ring or gasket. In other words, I have determined that the larger the throat angle, the less the stresses in the housing body, and the less the wear on the tapered or operating throat surface thereof. I have determined that where P is 1180 pounds, $d$ is 4.25", and D is 5 9/16", for a throat angle of 3°, the total pressure in pounds on the coil element will be about 20,500 or 226 pounds for each turn of a 90 turn coil; for a throat angle of 6°, the total pressure will be 10,250 pounds; for a throat angle of 9°, the total pressure will be 7,000 pounds; and, for a throat angle of 12°, the total pressure will be 5,200 pounds. Thus, it is advisable to use as large a throat angle or taper as possible, or in other words, to use an angle closely approximating the determined maximum effective throat angle. In this respect, a compound type of coupling, such as shown in Figure 1 of the drawings, has definitely advantageous characteristics in that the taper of the throat angle can be increased above the maximum critical angle when the nose part is provided with a tapered operating surface. As previously pointed out, under such conditions, the maximum effective angle is determined by the difference between the two tapers, e. g. the greater the difference angle, the less is $W_2$. As a result, the pressure upon the grip coil can be minimized by properly proportioning the two taper angles of the opposed and spaced-apart operating surfaces, while still insuring a fully fluid-pressure-proportioned gripping action.

The preferable initial location for the grip element or coil with respect to the tapered throat of the housing body is adjacent the joint between the cylindrical wall 12a and the sloped wall 12b, but should be such that the coil contacts the slope angle of the throat. This insures a quick, full, and flexible pressure response of the grip coil 13 to the action of the pressure heel portion 14a of the gasket element. That is, the gasket element 14 should be positioned within the cylindrical wall 12a to extend axially of the assembly from the abutment shoulder wall 11b and into free contact with the grip element 13.

Comparing Figure 2 with Figure 1, it will be noted that the upper and lower back faces of the heel portion 14a are tapered to facilitate movement of the pressure heel gasket element 14 along the slope of the throat and in engagement with the grip element 13. Fluid pressure is applied to the U-shaped chamber portion of the gasket element that is defined by the feather edges 14b and 14c. The effective pressure area or diameter of the gasket element 14 is thus the area presented by its back or chambered end to the fluid which is permitted to flow freely between spacing provided by the inserted nose part 15 and the cylindrical connector wall 11a of the housing body part. If the grip element 13 is initially positioned on the cylindrical wall 12a or in back of the tapered throat wall 12b, the gripping action may not be fully effective when fluid pressure is initially applied. In the first place, there will be a time lag in the gripping action, and in the second place, the slope of the joint between the walls 12a and 12b may be of a different value than the critical or desired value, due to a slight rounding-off in the manufacturing operation. It is thus apparent that the grip element, for fully effective action, should have an initial position on the tapered throat surface 12b, such that it will always maintain a desired holding action, regardless of the variations and surges in the line pressure and will have a fully flexible, continuous, adjusting action.

It is preferable to provide the opposed faces a and b with the same slope, although as previously intimated, it is the inner front slope face b which is the effective slope from the standpoint of the gripping action. The outer back slope face a is primarily important from the standpoint of the releasing action of the grip element when fluid pressure is turned off. It is thus apparent that the slope of the back face may be different than that of the front face without adversely effecting the desired gripping action.

In Figure 8, the radius of curvature of the outer periphery of the grip element 13 is the radius of a coil turn, itself; the arcs are in a 90° relationship in planes. This stabilizes the action that tends to establish resilience under load change and minimizes surface deformation at coil contacts on the pipe end or nose and on the coupling throat. The contact action is similar to a roller or ball bearing. The cross section may be an ellipse or circle with cut off sides.

Figure 1A illustrates an initial holding and an ordinary working position of the grip annulus 13 which may be attained if the fluid pressure is stable or is at a minimum value. On the other hand, in Figure 2 the grip annulus 13 is shown as advanced along the slope face b to indicate its position when a relatively high, maximum surge of fluid pressure is being applied. As compared to a single slope type of coupling, my compound type provides an increased gripping action with a minimum of grip coil movement or roll, such that the end portion of the conduit member 10 has very little movement with respect to the coupling body 12 and will not reach the cylindrical portion d of the nose part 15 upon the application of a maximum pressure for which it is constructed. As a result, the grip annulus or coil 13 may be wound more openly with less turns to provide it with more resiliency in its releasing action when fluid pressure is relieved.

Ordinarily, I have determined that a depth of a groove of about 1/32 to 1/16 of an inch on a side or of 1/16 to 1/8 of an inch on the overall diameter of the nose part will be sufficient. Thus, the thickness of the nose part 15 does not have to be very great to permit its grooving-out at 15a. Its dual thickness with the end portion of the pipe or conduit 10 provides a relatively strong structural end portion such that a grooving or machining out of the nose part 15 is permissible.

What I claim is:

1. In a push-in assembly and pull-out release fluid-pressure-sensitive coupling which has line-pressure shock-absorbing and positive position-return characteristics and which has a hollow housing body to position a conduit nose in a spaced relation therein, wherein the housing body carries a resilient grip annulus of convoluted construction and a pressure-sensitive annular gasket in operative association therein, and wherein the housing body has an integral longitudinally-outwardly-converging cone-shaped operating surface throat portion for the outer periphery of the grip annulus, the combination of a cylindrical gasket-positioning surface on the conduit nose, a grip annulus position-retaining radially-inwardly-offset annular portion about and in an intermediate position on and as a integral part of said cylidrical surface, said annular portion having a radially-outwardly spread-apart section longitudinally of the coupling axis with respect to the grip annulus to position the grip annulus for backward and forward rolling take-up and return action, said annular retaining portion being defined by an inner operating surface for the grip annulus that has a central base face and a pair of opposed front and back radially-outwardly diverging cone-shaped faces, said cylindrical surface having a lesser outer diameter than the initial inner diameter of the grip annulus, the grip annulus being retained by rolling abutment on the operating surface throat portion and in a relation of reduced inner diameter and in a recoil-absorbing position longitudinally of the coupling and of rolling abutment on the back operating face of said annular portion when the members are in a coupled relationship with each other and fluid pressure is being applied to the coupling, said cone-shaped back face defining an inner operating surface for the grip annulus and converging-outwardly longitudinally of the coupling axis in the direction of and with respect to the operating surface throat portion to define a compound tapered converging operating space longitudinally of the coupling axis for the grip annulus, said back face having only a rolling tangential contact with the inner periphery of the grip annulus to provide a shock-absorbing rolling-recoil action between the coupling body and the conduit nose when fluid pressure is applied in surges, the taper of said back face having a different angular relationship with respect to the longitudinal axis of the coupling than the taper of the operating surface throat portion, and the difference between the tapers of the throat portion and said front operating face being within a maximum of 17 degrees to provide an effective and proportional fluid-pressure-actuated gripping action of the grip annulus on the conduit nose, said operating surface throat portion defining a taper with respect to the longitudinal axis of the coupling of greater than 17°, and said back operating face defining a taper with respect to the longitudinal axis of the coupling of less than 17°.

2. In a push-in assembly and pull-out release fluid-pressure-sensitive coupling which has line-pressure shock absorbing and positive-grip-return characteristics and which has a housing body to position a conduit nose in a spaced relationship therein, wherein the housing body carries a resilient grip annulus of coil-like construction having spaced-apart convolutions and a pressure-sensitive annular gasket in operative association therein, wherein the housing body has a longitudinally-outwardly converging cone-shaped operating surface throat portion for the outer periphery of the convolutions of the grip annulus, the combination of a cylindrical gasket-positioning surface on the conduit nose, said cylindrical surface having a lesser outer diameter than the initial inner diameter of the convolutions of the grip annulus, an annular groove portion about and in an intermediate position on said cylindrical surface of the conduit nose, said groove portion defining retaining surfaces for the inner periphery of the grip annulus in engagement therewith when the convolutions of the grip annulus are compressed by rolling movement of its outer periphery towards the converging end of the operating surface throat portion, said retaining surfaces comprising a base surface and opposed front and back radially-outwardly spread-apart operating surfaces longitudinally of the coupling axis, said back operating surface being of cone-shape of planar longitudinal section and of lesser taper with respect to the longitudinal axis of the coupling than the radius of curvature of the grip annulus, said back operating surface defining a tangential rolling surface on which the grip annulus advances longitudinally-forwardly out of said base surface when fluid pressure is applied, said opposed front and back operating surfaces of said groove portion positively retaining the grip annulus in an operating position during an application of fluid pressure to the coupling, said back operating surface inclining longitudinally of the coupling towards the base of the groove portion in an opposed radial relation with the operating surface throat portion to define a longitudinally-outwardly-converging differential-compound operating spacing for the grip annulus; the grip annulus having a rolling-recoil action with said groove portion between the opposed operating surfaces; said grip annulus upon a release of fluid pressure and a longitudinal-inward movement of the conduit nose, being moved into engagement with said back operating surface, and being carried forwardly towards the diverging end of the operating surface throat portion to release the conduit nose; and said back operating surface defining a lesser taper with respect to the longitudinal axis of the coupling than and a differential angle of taper with the operating surface throat portion that constitutes an effective single-surface taper approaching a maximum of 17 degrees for an effective fluid-pressure-proportioned member-gripping action between the housing body and the conduit nose, said operating surface throat portion defining a taper with respect to the longitudinal axis of the coupling of greater than 17°, and said back operating face defining a taper with respect to the longitudinal axis of the coupling of less than 17°.

3. In a push-in assembly and pull-out release fluid-pressure-sensitive coupling which has line-pressure shock-absorbing and positive-return and creep-preventing characteristics and which has a housing body to position a conduit nose in a spaced relationship therein, wherein the housing body carried a spirally-convoluted resilient grip annulus and a pressure-sensitive annular gasket in operative association therein, wherein the housing body has an integral longitudinally-forwardly converging cone-shaped operating surface throat portion for the outer periphery of the grip annulus, the combination of a cylindrical gasket-positioning surface on the conduit nose, an annular groove portion about and in an intermediate position on and as an integral part of said cylindrical surface to operatively position and retain the grip annulus therein along its inner periphery, said annular groove portion being defined by a central base face and by a pair of opposed front and back radially-outwardly spread-apart operating faces, the grip annulus having a radially-contractible internal diameter that is initially greater than the external diameter of said cylindrical gasket-positioning surface, said annular groove portion cooperating with the operating surface throat portion to retain the grip annulus in a radially-contracted operating position therein during and initially after an application of fluid pressure to the coupling, said back operating face being of cone-shape and converging longitudinally-outwardly with respect to the operating surface throat portion and in the direction of the longitudinal axis of the coupling to define a forwardly-converging operating spacing for the grip annulus; the grip annulus having a rolling action within said groove portion between said opposed operating faces, said grip annulus upon a surge of fluid pressure defining a tangential forward rolling-gripping contact with said back operating face, said grip annulus upon a release of fluid pressure and an inward movement of the conduit nose being rolled into engagement with said front operating face and being carried forwardly on the conduit nose towards the diverging end of the operating surface throat portion to release the conduit nose, and said back operating face defining a lesser taper with respect to the longitudinal axis of the coupling than and a differential angle of taper with the operating surface throat portion that constitutes an effective single-surface taper for a fluid-pressure-proportioned gripping action on the conduit nose of a maximum of 17°, said operating surface throat portion defining a taper with respect to the longitudinal axis of the coupling of greater than 17°, and said back operating face defining a taper with respect to the longitudinal axis of the coupling of less than 17°, and the defined construction enabling pivotal action between the spaced housing body and coupling nose without adversely effecting the holding action of said grip annulus.

References Cited in the file of this patent
UNITED STATES PATENTS

| | | |
|---|---|---|
| 1,754,639 | Meyer | Apr. 15, 1930 |
| 2,069,377 | Matthiessen | Feb. 2, 1937 |
| 2,111,956 | Baldwin | Mar. 22, 1938 |
| 2,184,376 | Beyer et al. | Dec. 26, 1939 |
| 2,225,610 | Christian | Dec. 24, 1940 |
| 2,259,453 | Beyer et al. | Oct. 21, 1941 |
| 2,587,810 | Beyer | Mar. 4, 1952 |
| 2,631,872 | Wurmser | Mar. 17, 1953 |
| 2,693,378 | Beyer | Nov. 2, 1954 |
| 2,709,092 | Wallace | May 24, 1955 |